Jan. 8, 1929.
F. M. CASE
1,697,850
FISHING REEL SPOOL
Filed June 26, 1925
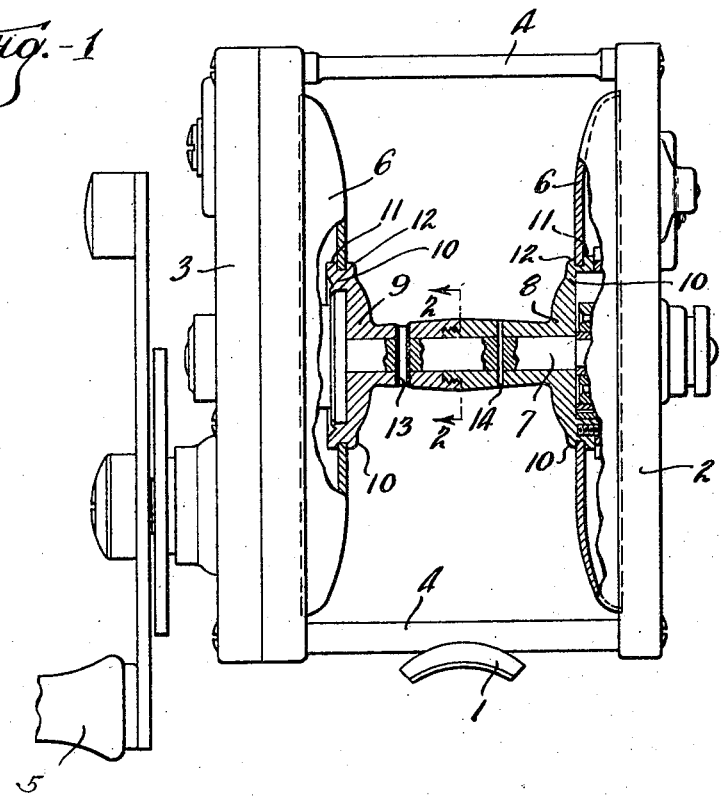
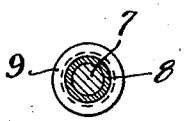
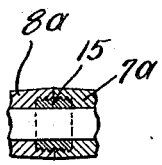
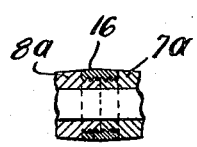
Inventor
Francis M. Case
By Brockett, Hyde & Milburn
Attorneys Patented Jan. 8, 1929.

1,697,850

UNITED STATES PATENT OFFICE.

FRANCIS M. CASE, OF CLEVELAND, OHIO, ASSIGNOR TO THE ENTERPRISE MANUFACTURING COMPANY, OF AKRON, OHIO, A CORPORATION OF OHIO.

FISHING-REEL SPOOL.

Original application filed July 26, 1923, Serial No. 653,916. Divided and this application filed June 26, 1925. Serial No. 39,726.

This invention relates to improvements in fishing reels, the present application being a division of my co-pending application for fishing reels, filed July 26, 1923, Serial No. 653,916.

The object of the present invention is to improve the construction of the line receiving spool and thereby enable it to be more readily manufactured and assembled and its strength to be largely increased so that it is more resistant to bending or distortion of the spool end heads on the spool hub.

Further objects of the invention are in part obvious and in part will appear more in detail hereinafter.

In the drawing, Fig. 1 is a side elevation of a fishing reel embodying the invention, part of the line receiving spool being in section; Fig. 2 is a detail cross sectional view on the line 2—2, Fig. 1; and Figs. 3 and 4 are detail sectional views illustrating modified means for connecting the separable spool hub portions.

The fishing reel shown in the drawing includes the usual frame having a foot plate 1 adapted for attachment to a fishing rod and end caps or heads 2, 3 connected by the usual pillars or posts 4. In this frame rotates the line receiving spool which is adapted to be driven by the operating handle 5, as is usual.

The line receiving spool comprises two concave end heads 6 mounted upon the ends of the spool hub, the latter being sleeved upon and rotatable with the spool shaft or spindle 7 which is journalled in suitable bearings in the end heads or caps 2, 3. The spool hub comprises two members 8, 9 provided respectively with male and female threads to form a separable joint midway between the end heads, such joint enabling the spool heads to be assembled on the hub members. Each of the hub members 8, 9 has an enlarged end portion 10 provided with a circumferentially extending flange 11 against which a spool head seats, each head being secured in position after assembly on its hub member by peening or beading over the metal of the hub member onto the inner face of the spool end head, as indicated at 12, Fig. 1.

The line receiving spool and the shaft or spindle 7 may be secured for rotation together by fitting a short piece of tubing 13 into registering diametric openings in the spindle and one hub member to form the usual line attaching means, and by a cross pin 14 through the spindle and the other hub member.

The arrangement described provides a line receiving spool which is very simple to manufacture and which is strongly re-inforced against distortion of its end heads, such as by the outward pressure of the line being tightly wound into the line receiving space. Any such tendency is resisted by the strong backing flanges 11.

In prior fishing reel spools, it has been customary to form the center or main portion of the spool in a single piece with outwardly facing heavy shoulders at the ends. The end heads have then been assembled by placing them against the shoulders and spinning the metal of the center around the outside of the heads. In reels subjected to very heavy strains, such as those used in salt water fishing, the pressure upon the spool built up by reeling in a very large fish is enormous, and the spool frequently fails because the spun over flanges are not strong enough to withstand the heavy pressure. In the present spool, however, the inwardly facing shoulders or flanges 11, which are heavier than it is possible to spin or peen over, reinforce the spool ends against outward strain or movement and offer a much more effective backing for the heads of the spool, and the two-part spool center or hub 8, 9 permits the assembly of the spool, which otherwise could not be accomplished.

Figs. 3 and 4 illustrate modified arrangements of connecting means for the separable hub portions, either of which connecting means may be substituted for the form shown in Fig. 1, if desired. In both modified forms, the spool hub is divided transversely between its ends to provide separable hub portions 7ª and 8ª of like construction, each of said portions being threaded for connection to a threaded ring or sleeve. This ring, marked 15 in Fig. 3, is sleeved upon the spindle 7 and is externally threaded to receive the internal threads of the two hub portions. In Fig. 4, the ring or sleeve 16 is internally threaded to receive the externally threaded portions of the hub portions.

Other arrangements are also suitable for the purpose so long as the spool includes two separable parts, preferably alike in form for cheapness of manufacture and adapted for proper attachment thereto of the spool heads and rigid connection to each other when assembled for use.

What I claim is:

1. In a fishing reel, a spool comprising a hub having opposite end portions provided with heavy inwardly facing peripheral flanges, heads seating outwardly against said flanges, the metal of the hub being deformed inwardly of the heads to hold the same against said flanges, and said hub including two separable axial aligned parts and a spindle extending axially therethrough.

2. In a fishing reel, a spool comprising a hub provided with heavy inwardly facing shoulders and separate end heads connected thereto and seating outwardly on said shoulders, said hub including two separable parts telescoping each other and adapted for substantially rigid connection to each other.

3. In a fishing reel, a spool comprising a hub provided with heavy inwardly facing shoulders and separate end heads connected thereto and seating outwardly on said shoulders, said hub including two separable threaded parts adapted for substantially rigid threaded connection to each other.

4. A spool structure for fishing reels, comprising a spool hub formed in two parts connected together, each part being provided with heavy outer shoulders, and end heads placed against the inner surfaces of the shoulders and secured in position.

5. A spool structure for fishing reels, comprising a spool hub formed in separate parts permanently connected together between the spool ends, integral shoulders formed upon the outer extremities of the said parts, and end heads secured in position against the inner walls of the shoulders.

6. A spool structure for fishing reels, comprising a spool shaft, a hub thereon composed of two separate parts connected together intermediate the ends of the spool, the hub having heavy shoulders at the ends of the spool, and end heads resting against the inner faces of the shoulders and permanently secured in position.

7. A spool structure for fishing reels, comprising a spool shaft, a hub composed of two separate parts sleeved upon said shaft, end heads permanently connected to said hub parts, a solid pin passing through one part of the shaft for securing them together, and a tubular pin passing through the other hub part and the shaft for securing them together.

In testimony whereof I hereby affix my signature.

FRANCIS M. CASE.